United States Patent [19]

Moller

[11] 4,202,653
[45] May 13, 1980

[54] PIPE HANDLING APPARATUS
[75] Inventor: Walter H. Moller, Bellevue, Wash.
[73] Assignee: Western Gear Corporation, Everett, Wash.
[21] Appl. No.: 919,672
[22] Filed: Jun. 27, 1978

Related U.S. Application Data

[62] Division of Ser. No. 682,052, Apr. 30, 1976, Pat. No. 4,129,221.

[51] Int. Cl.² .............................................. B65G 47/90
[52] U.S. Cl. ...................................... 414/22; 414/225; 414/745
[58] Field of Search ................. 214/1 BB, 1 B, 1 R, 214/1 P, 2.5, 152; 175/52, 85, 220; 308/3.9; 254/106; 414/225, 22, 751, 745, 753, 786

[56] References Cited

U.S. PATENT DOCUMENTS

| | | | |
|---|---|---|---|
| 2,829,783 | 4/1958 | Blagg | 214/1 P X |
| 3,874,518 | 4/1975 | Swoboda, Jr. et al. | 214/1 P |
| 3,939,990 | 2/1976 | Johnson | 214/1 P |
| 4,013,178 | 3/1977 | Brown | 214/2.5 |

FOREIGN PATENT DOCUMENTS

| | | | |
|---|---|---|---|
| 1275977 | 8/1968 | Fed. Rep. of Germany | 175/85 |
| 1242503 | 8/1971 | United Kingdom | 214/1 P |

*Primary Examiner*—Frank E. Werner
*Attorney, Agent, or Firm*—Seed, Berry, Vernon & Baynham

[57] ABSTRACT

Various pipe handling systems including bridge crane and swing crane embodiments for storing and moving small diameter drill pipe, larger diameter casing pipe and still larger diameter riser pipe to and from a common axial transport between a drilling rig platform and storage racks. Unique components of the systems include a piggyback riser and casing skate, spin rolls for uncoupling the pipe located between the racks and the axial transport, and a modular stabber which can accommodate all three basic sizes of pipe.

13 Claims, 38 Drawing Figures

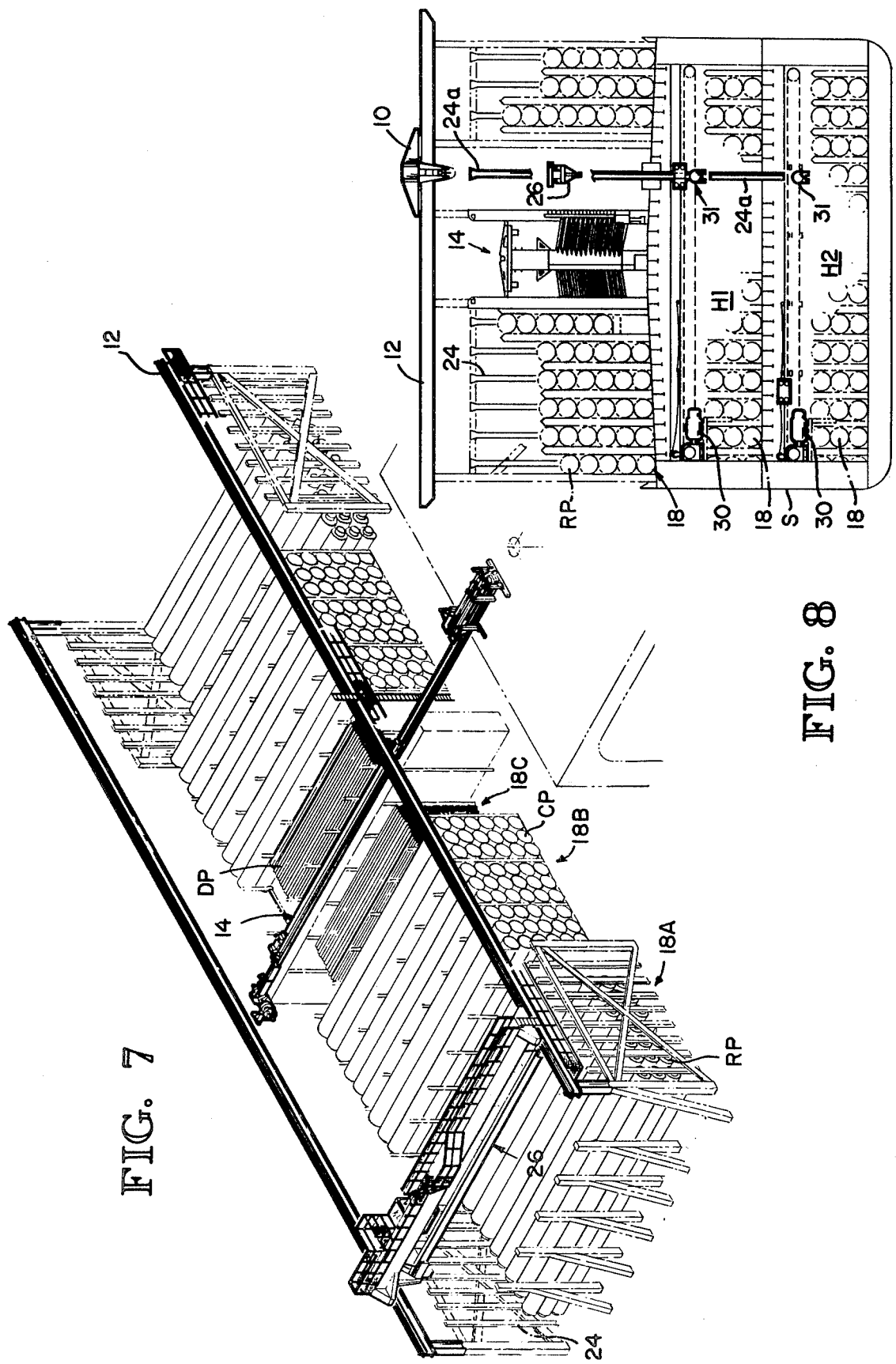

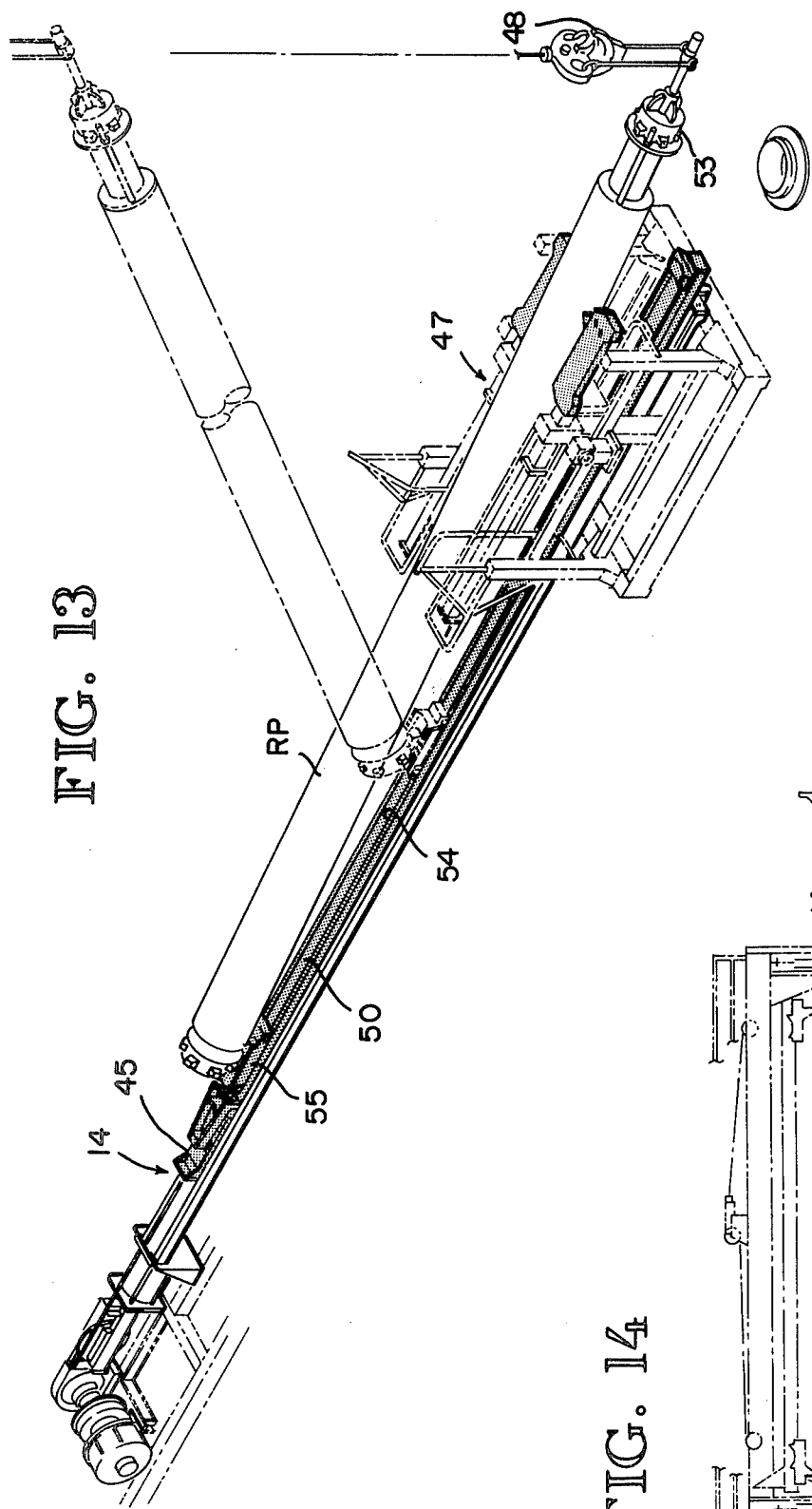
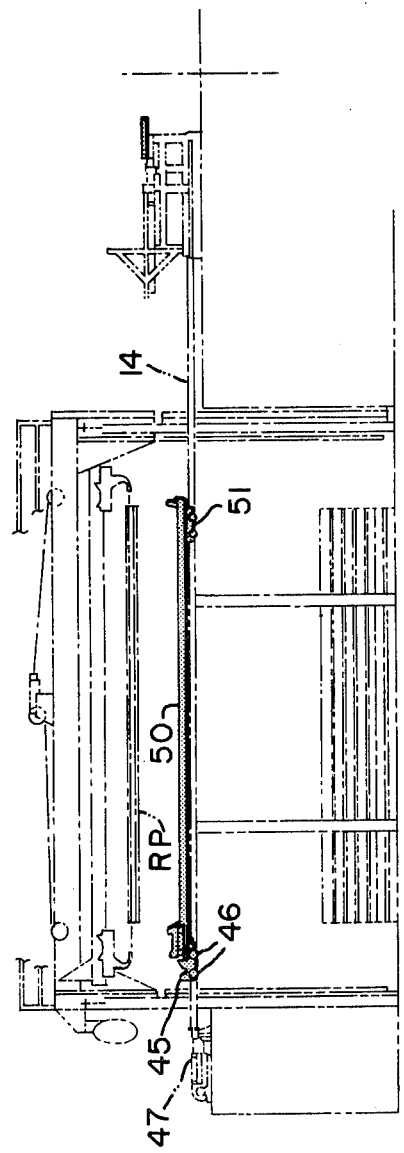

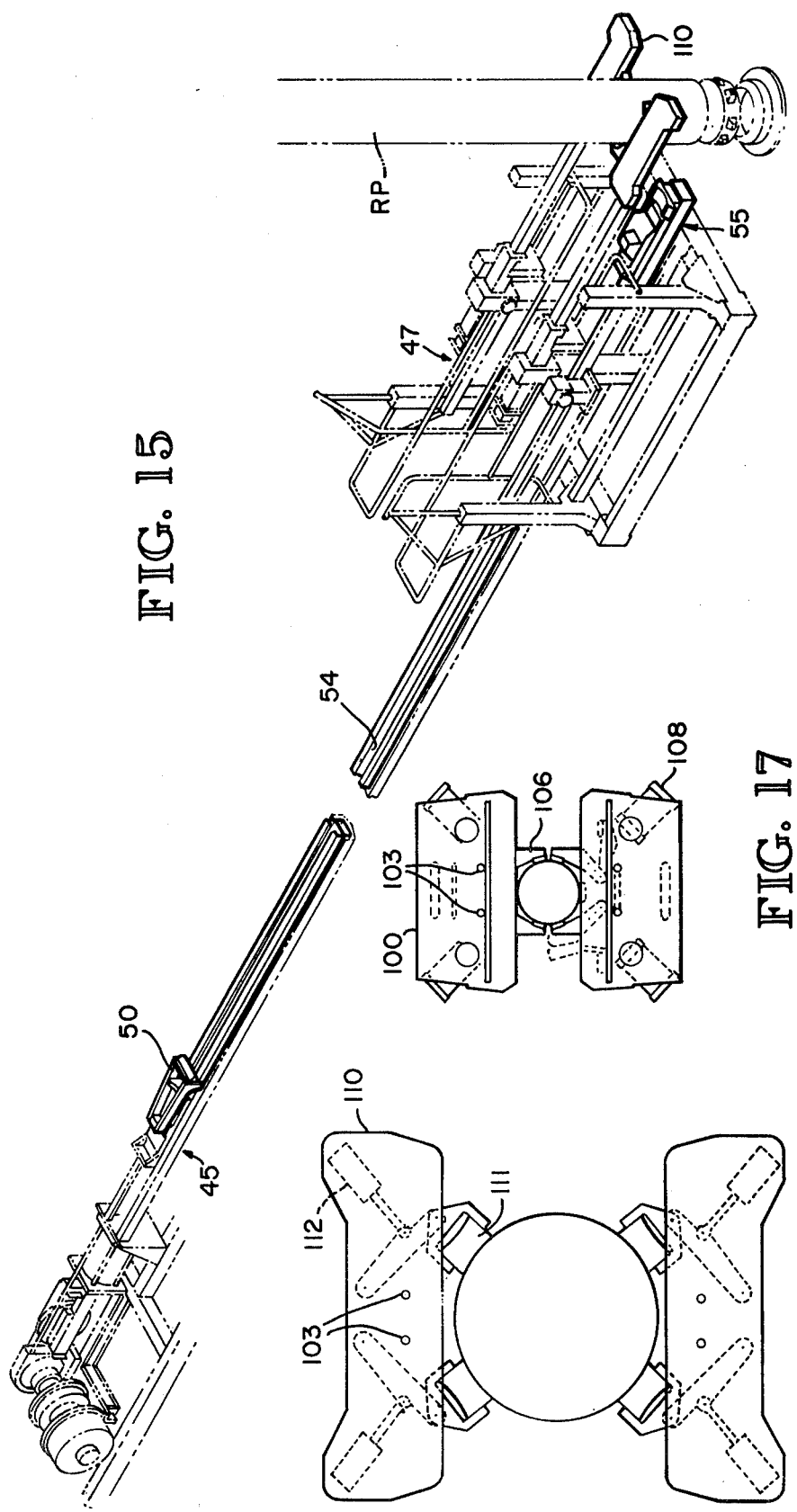

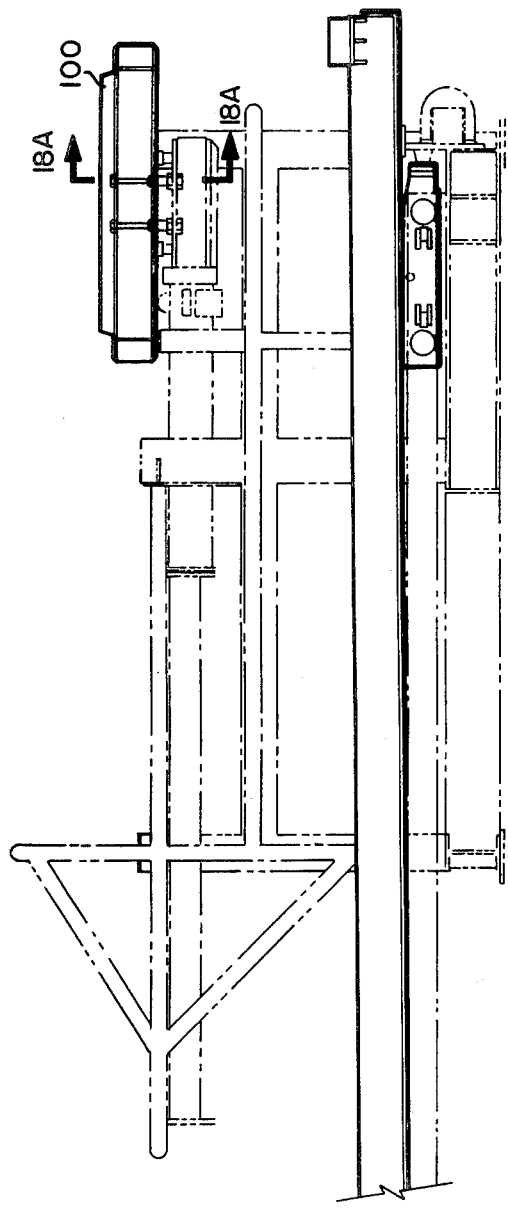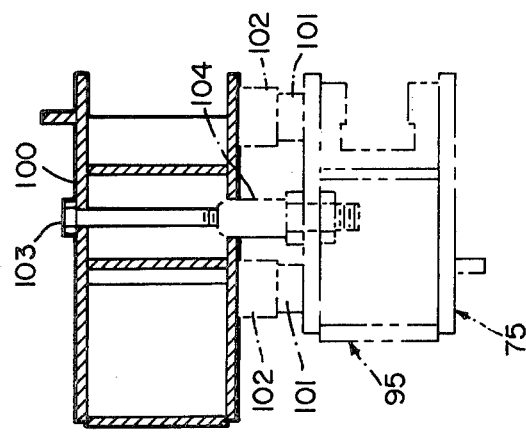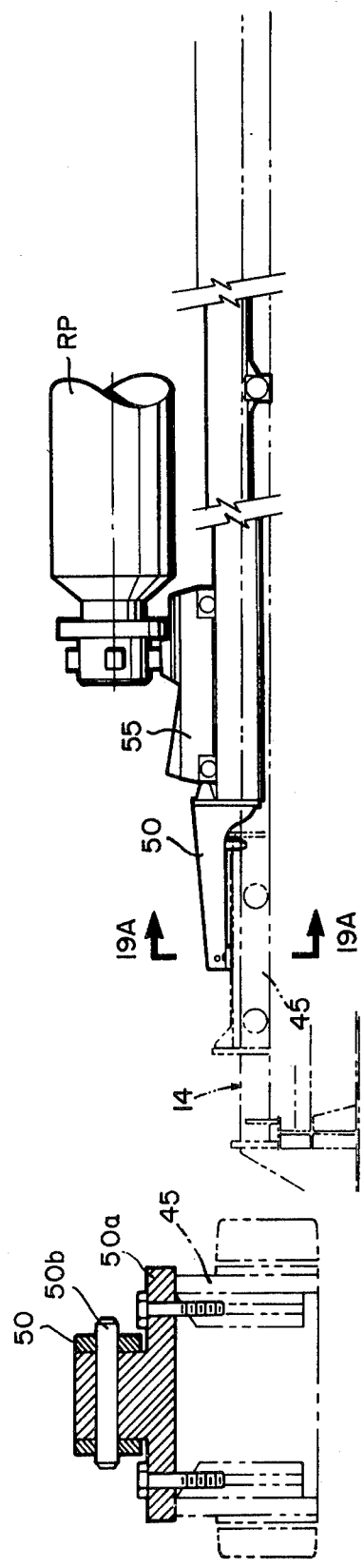

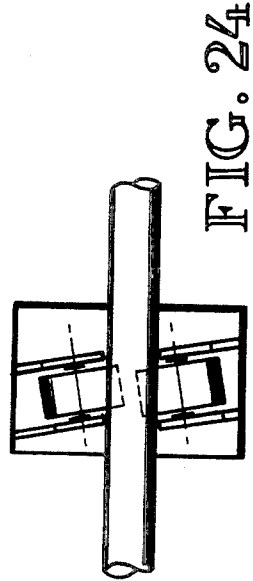
FIG. 24
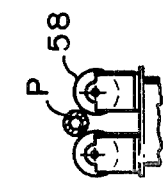
FIG. 22
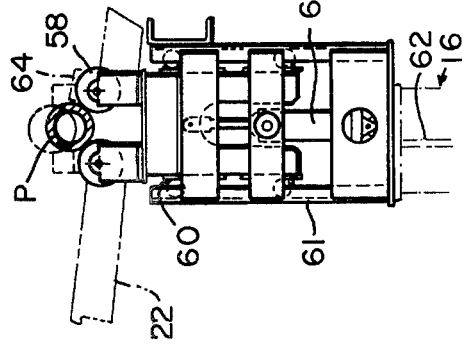
FIG. 23
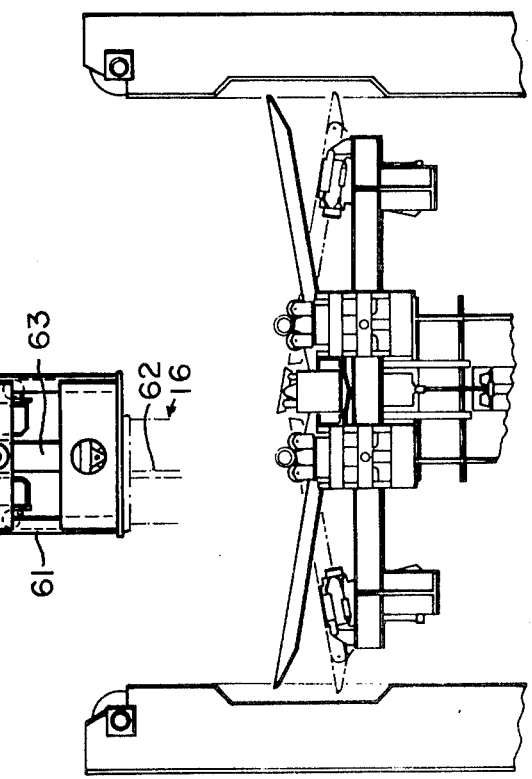
FIG. 21
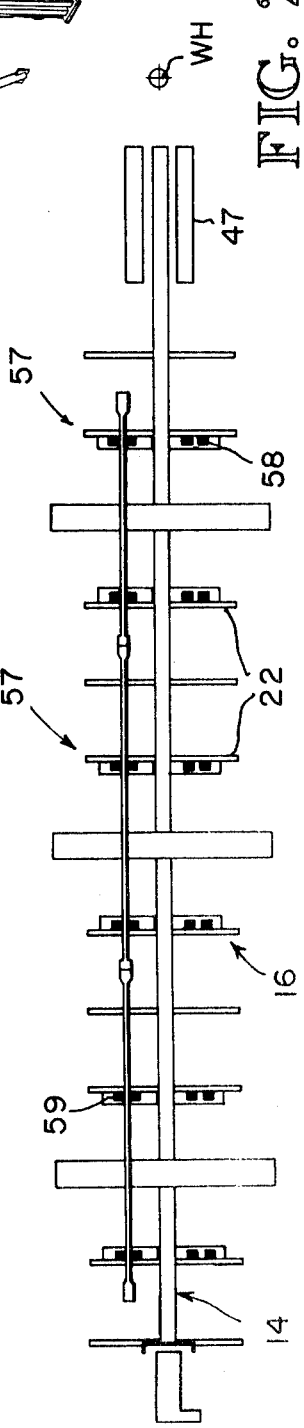
FIG. 20
FIG. 23A

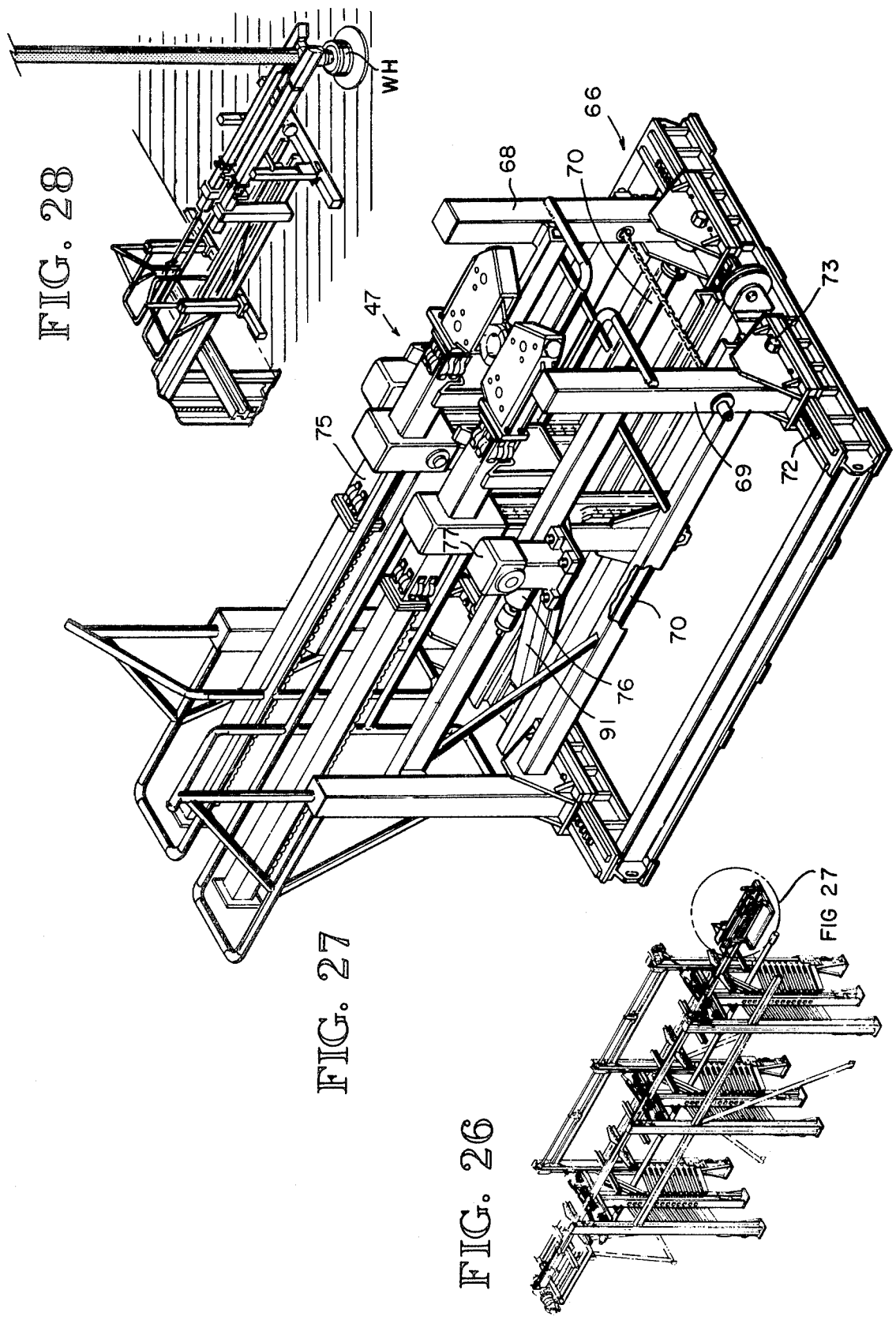

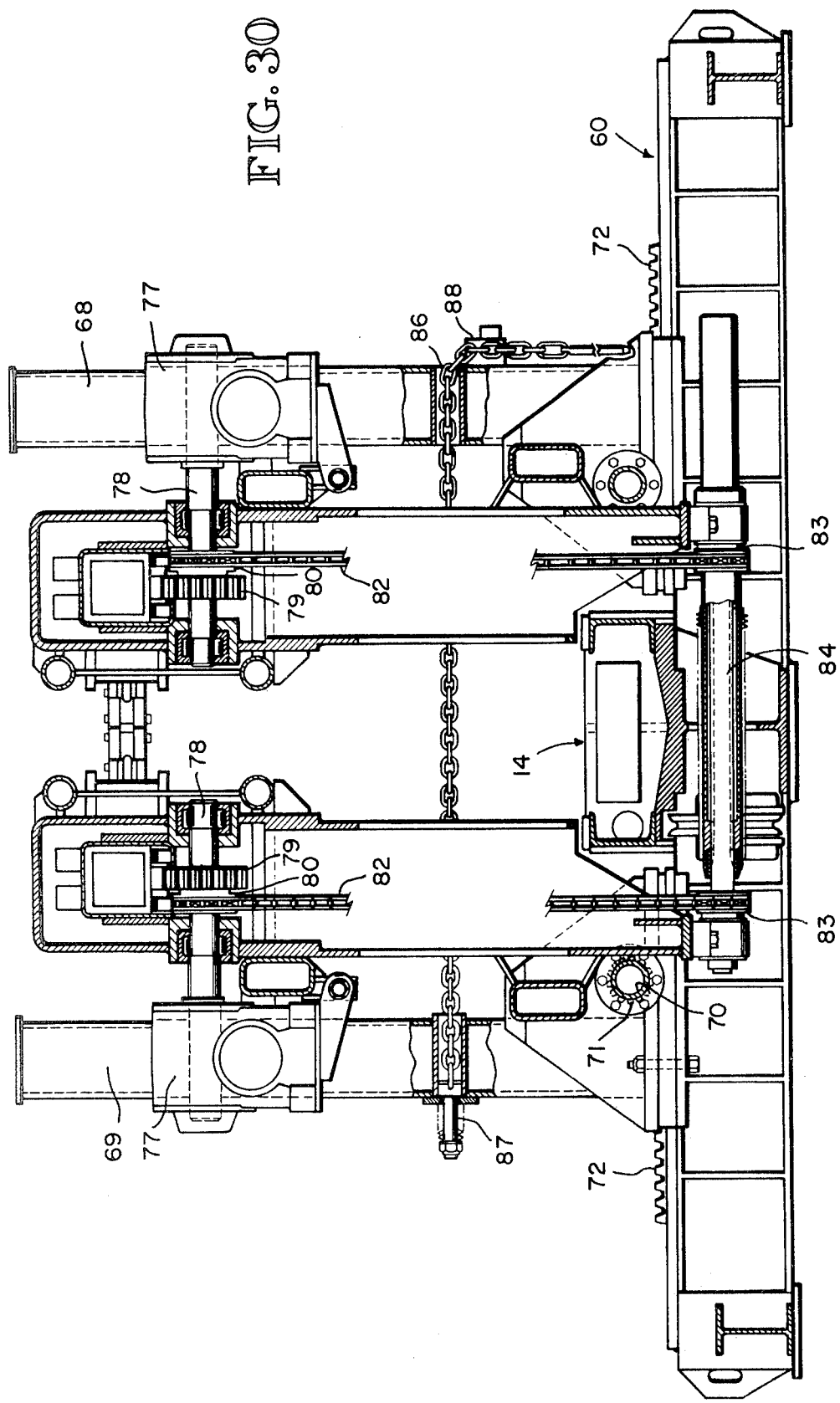

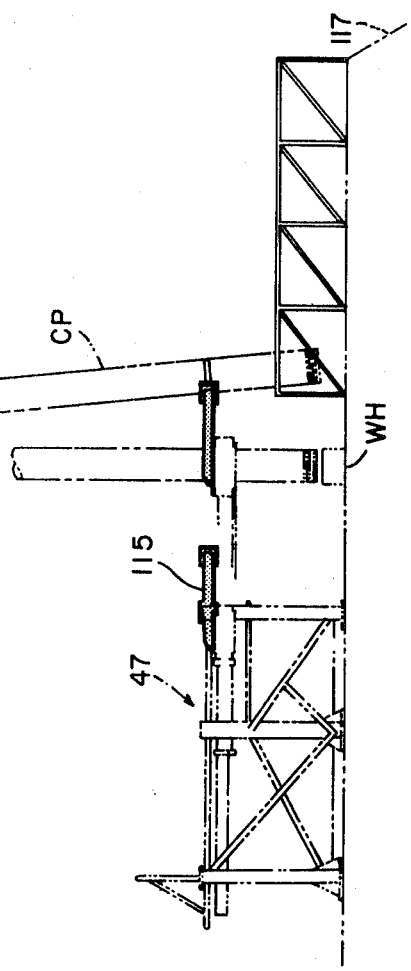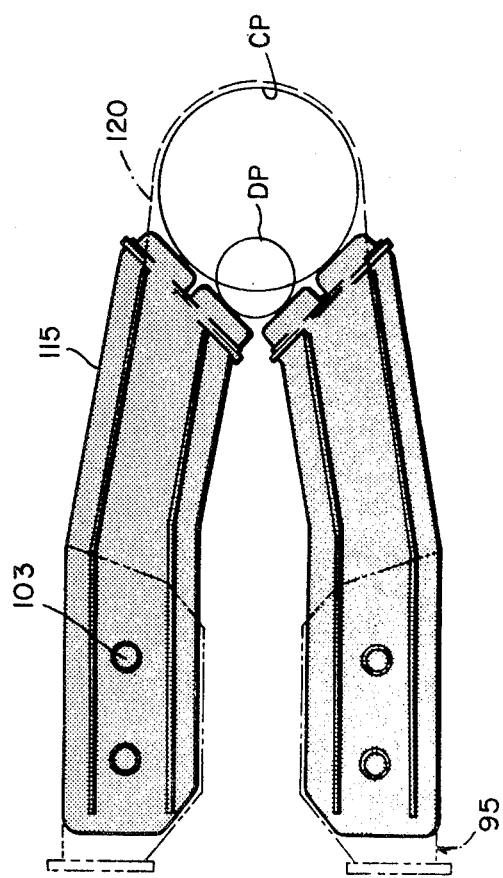

PIPE HANDLING APPARATUS

This is a division of application Ser. No. 682,052, filed Apr. 30, 1976, now U.S. Pat. No. 4,129,221.

The present invention relates to handling systems and apparatus particularly adapted for use with the tubular goods normally required in off-shore drilling operations, and namely, drill pipe, riser pipe and casing pipe.

Heretofore, the assignee of this patent application, Western Gear Corporation, has produced a drill pipe handling system utilizing its Model No. PR-20,000 pipe racker, a skate, and a stabber. This pipe racker was of the type illustrated in FIG. 1 of the present application and identified by reference numeral 16 and functioned to store drill pipe on left and right rows of pivoted storage arms such swung down at their outer ends to roll pipe to respective outer elevators or vertcal conveyors for delivery to the skate via respective upper pivoted ramp arms which swung up to roll pipe from the elevator inwardly or which swung downwardly to roll pipe from the skate into a storage position during a tripping operation. The skate operated in a central track located at the top of the pipe racker and supported only the rear end of the pipe length being transported to or from the stabber. The forward end (elevator end) of the pipe was skidded in a trough provided at the bottom of the skate track.

In the prior Western Gear drill pipe handling system the stabber had extendible jaw arms which gripped and guided the lower end of the pipe into operative position while the other end was conventionally raised by the elevator at the drill rig.

The above described pipe racker, skate, skate track and trough, and stabber were only capable of handling pipe in the general size range of standard drill pipe, 3½" to 5" in diameter, and a completely independent system was required to handle riser and casing which are considerably larger in length, diameter and weight.

In general, this invention has as its principle object, the providing of a pipe/riser/casing handling system having improved productivity by increasing the operating capability in heavy seas, reducing the operating cost, and increasing the safety by reducing manual handling. The invention further aims to give an improved system wherein adapters are provided for the skate and stabber so that they can also be utilized for the handling of riser or casing.

Another object is to provide an improved system wherein the storage of the drill pipe, riser and casing is more efficient in its use of space and gives better control of the center of gravity of the loaded drill ship or platform.

Other particular objects of the improved system of the invention are to provide mechanical containment of the riser and casing during handling and to eliminate damage of the exterior buoyancy material on the riser while being stored and handled.

Still another object is to advantageously allow use of the drill pipe skate and track (axial transport means) for handling larger sized casing and riser pipe.

In carrying out this invention the riser and casing are stored in parallel relation to the drill pipe in racks to the sides of and/or below the pipe racker, and swing cranes and/or bridge cranes are utilized to move the riser/casing to or from an axial transport station at the top of the pipe racker. The skate for drill pipe handling is provided with an adapter or piggyback skate taking the form of an elongated cradle having a fifth-wheel connection to the drill pipe skate and a carriage at its stabber end. The stabber is modular for ease of installation and is provided as an adjustable unit and has adapter jaws which are easily placed into operative position on the drill pipe handling jaws for alternatively gripping the riser/casing.

Spin rolls in one embodiment are located adjacent the skate to allow uncoupling of sections of pipe conveniently during the make-up of a drill string.

The invention thus includes unique overall tubular goods handling concepts but also independently unique components of the system.

BRIEF DESCRIPTION OF THE FIGURES OF THE DRAWING

FIG. 7 is a second embodiment of a pipe handling system in which an overhead crane moves large casing and riser pipe as well as smaller drill pipe to a central axial transporting mechanism.

FIG. 8 is a third embodiment of the pipe handling system in which the overhead bridge crane can also lift pipe from below deck on the drilling vessel.

FIG. 13 is an enlarged isometric illustrating a unique piggyback skate or adapter for modifying a smaller pipe skate to handle larger riser and casing pipe.

FIG. 14 is a schematic side elevation of the piggyback skate used in conjunction with a bridge-crane type handling system.

FIG. 15 is an isometric illustrating the piggyback skate.

FIG. 16 is a schematic plan of part of a stabber modified to accommodate larger riser pipe.

FIG. 17 is a stabber adapter modified to handle larger casing pipe.

FIG. 18 is a schematic side elevation illustrating the stabber jaws to which the modifications of FIGS. 16 and 17 may be used.

FIG. 18A is a vertical section taken along the line 18A—18A.

FIG. 19 is a fragmentary side elevation of the piggyback skate of FIG. 13.

FIG. 19A is a vertical section taken along the line 19A—19A.

FIG. 20 is a schematic plan view of a pipe delivery system which employs spin rolls to make up multiple sections of pipe.

FIG. 21 is a schematic isometric environmental view showing the location of the spin rollers on a preferred form of pipe racker.

FIG. 22 is a fragmentary vertical end elevation illustrating the spin rollers for handling 3½ inch diameter pipe.

FIG. 23 illustrates a schematic vertical section through the pipe delivery system of FIG. 20 showing a set of spin rollers on one side of a central skate track and with the spin rollers being adjusted to handle 5 inch diameter drill pipe.

FIG. 23A is a fragmentary vertical section of the pipe racker shown in FIG. 20 illustrating the location for the mounting of the spin rollers.

FIG. 24 is a fragmentary plan of a set of spin rollers shown in FIG. 23 illustrating the angle of the rotational axis of each roller.

FIG. 26 is another environmental isometric view illustrating the location of a stabber on a pipe racker.

FIG. 27 is an isometric of an improved stabber.

FIG. 28 is a fragmentary illustration of the stabber in location on the drill rig floor.

FIG. 30 is a vertical transverse section of the stabber.

FIG. 34 is an adapter to a pipe stabber.

FIG. 35 is an environmental side elevation illustrating use of the adapter stabber shown in FIG. 34 on a drill rig floor.

DETAILED DESCRIPTION OF THE PREFERRED EMBODIMENTS

Figure 1:
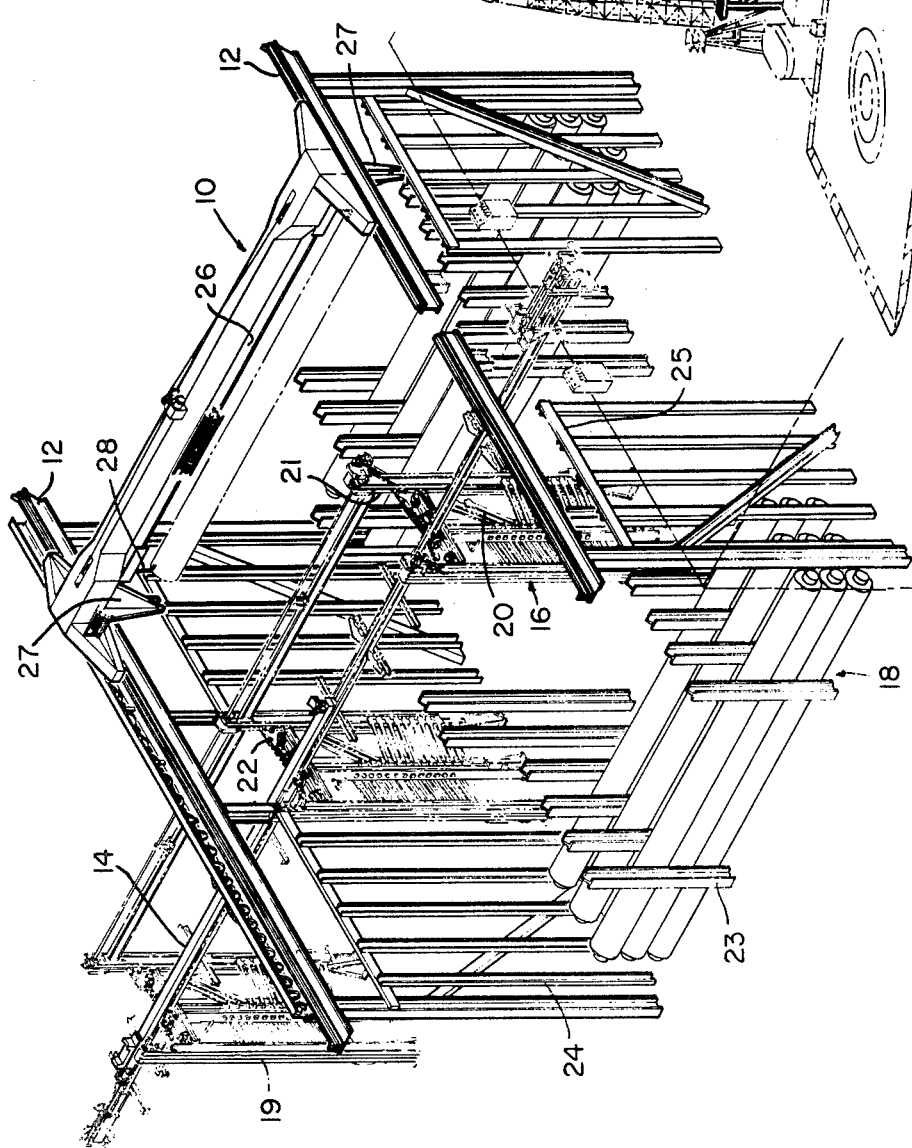
FIG. 1 is an overall isometric showing a bridge crane pipe handling system.

In general the invention relates to various overall pipe handling systems for handling various sized pipes on a ship, semisubmersible or other floating drilling rig. As used herein, the term "pipe" will include drill pipe, commonly 3½ inch and 5½ inch diameter, casing pipe such as 20 inch diameter and even larger riser pipe covered with a fragile buoyant covering such as 52 inch diameter. The overall systems will describe different embodiments all of which uniquely are adapted for handling the three types of pipe in a synergistic manner such that the pipe handling system is able to use many common components at great savings to the customers. In addition, the invention will be directed to individual components of a total pipe handling system each of which are believed to be unique in and of itself and useful in other and conventional pipe handling systems. For example, the invention will relate to a skate adapter or piggyback skate which can modify a smaller pipe skate into a much larger unit suitable for handling casing and riser pipe. Another unique component is the addition of spin rollers between the upper ramp arms adjacent the skate track and the pipe skate to enable the break up of multiple sections of pipe onboard the vessel. Still another unique component is a stabber which will be seen to be a readily installable modular unit with all components prealigned at time of manufacture and which is capable, with suitable adapters, for handling drill pipe, and riser and casing pipe.

Overall Pipe Handling Systems

As best shown in FIGS. 1-5, one embodiment of an overall pipe handling system comprises a bridge crane 10 of basically conventional construction which traverses a pair of beams 12 which lie transversely across a pipe axial transport means 14. The axial transport means 14 which is common to all embodiments of the invention and advantageously is employed as a key component in handling all the various pipe sizes lies longitudinally of the vessel S in an elevated position above the pipe storage areas. Spaced centrally below the axial transport means is a pipe racker 16. A suitable pipe racker is manufactured by the assignee of this application under the trade name PIPE RACKER Model No. PR-20,000. Spaced on either side of the pipe racker are rack bins 18 which store vertical columns or layers of riser or casing pipe.

The pipe racker 16 is preferably designed to handle smaller drill pipe of 3½ inches to 5 inches and is capable of handling 90 ft. triple pipe sections, 60 ft. or 90 ft. double pipe sections, or 45 ft. single pipe sections. The pipe racker 16 includes a plurality of longitudinally (longitudinal and transverse hereinafter will be relative to the path of axial movement of pipe on the axial transport means 14) spaced columns 19 each of which have a plurality of arms 20 which can be raised to receive downwardly moving pipe for storage. The pipe is moved vertically from the arms by a conveyor 21 which can be of any conventional construction and suitable to grasp a pipe and lift it upwardly onto inwardly inclined ramp arms 22, also known in phantom in FIG. 3. The details of the pipe racker 16 are not essential to an understanding of the overall systems, suffice it to say that a pipe racking system which uses a common axial transport means 14 such at the PR-20,000 can be used to handle the drill pipe in conjunction with the system about to be disclosed for handling the larger casing and riser pipe.

Figure 2:
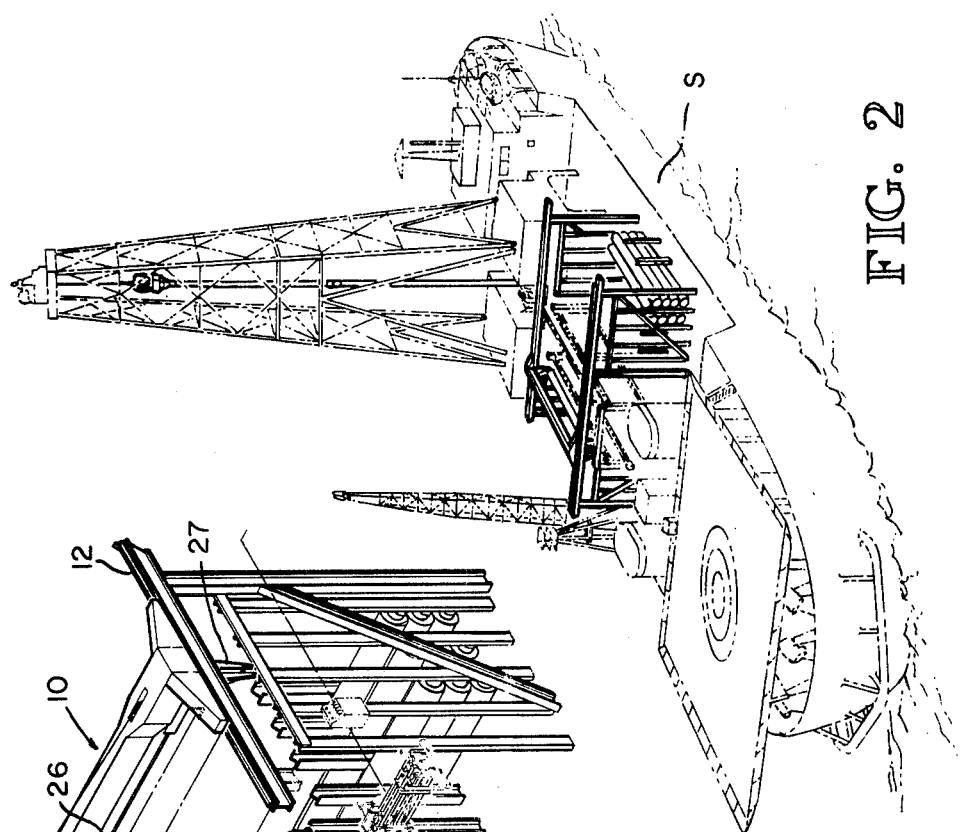
FIG. 2 is an environmental isometric illustrating the pipe handling system as applied to a shipboard drilling vessel.
Figure 3:
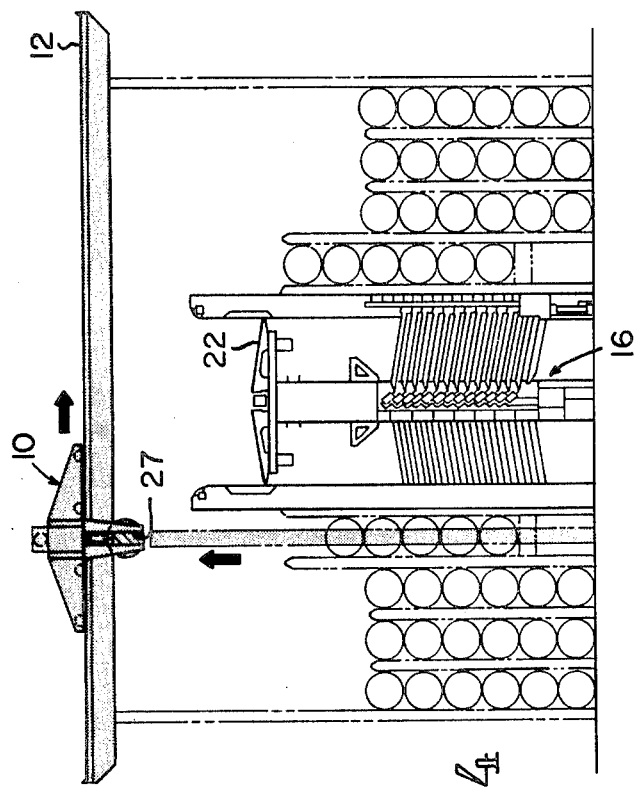
FIG. 3 is a fragmentary schematic vertical end elevation showing one step in the operation of the pipe handling system using a bridge-crane conveying technique.
Figure 4:
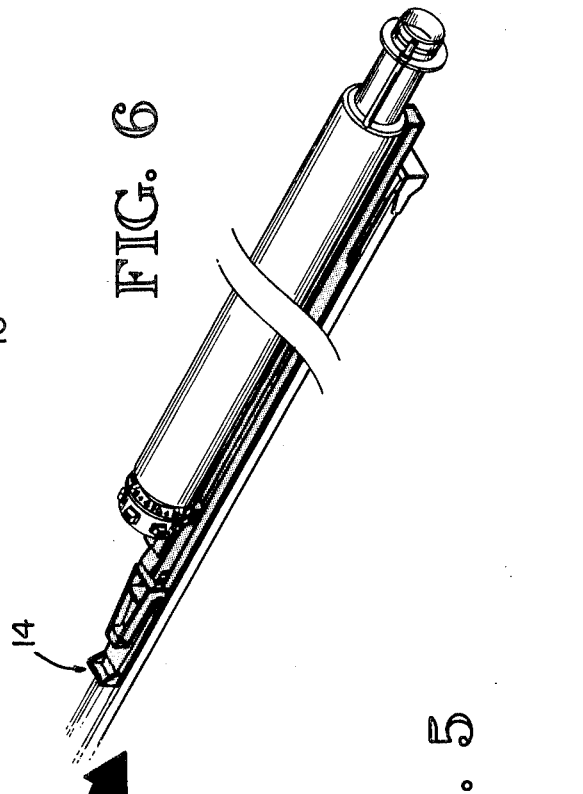
FIG. 4 illustrates another step in the operation of delivering a pipe.
Figure 5:
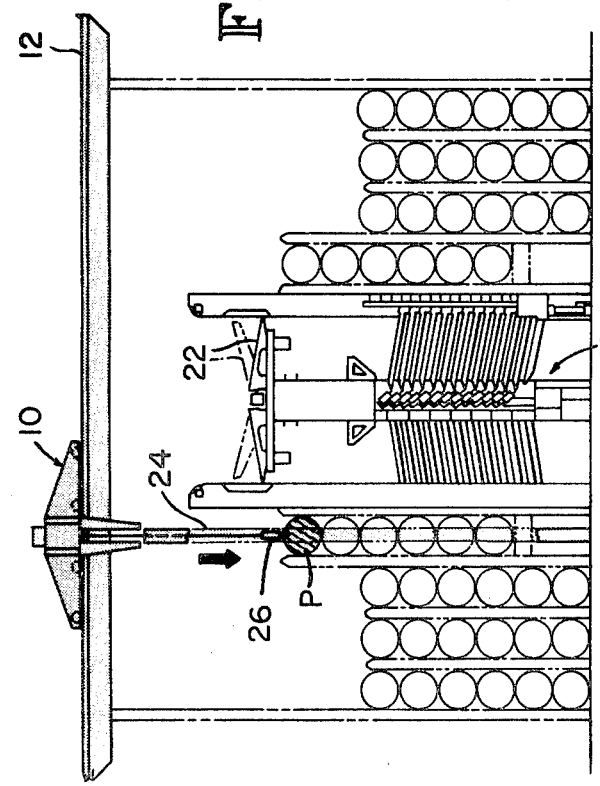
FIG. 5 is still another step in the operation wherein the riser pipe is lowered onto a skate.
Figure 6:
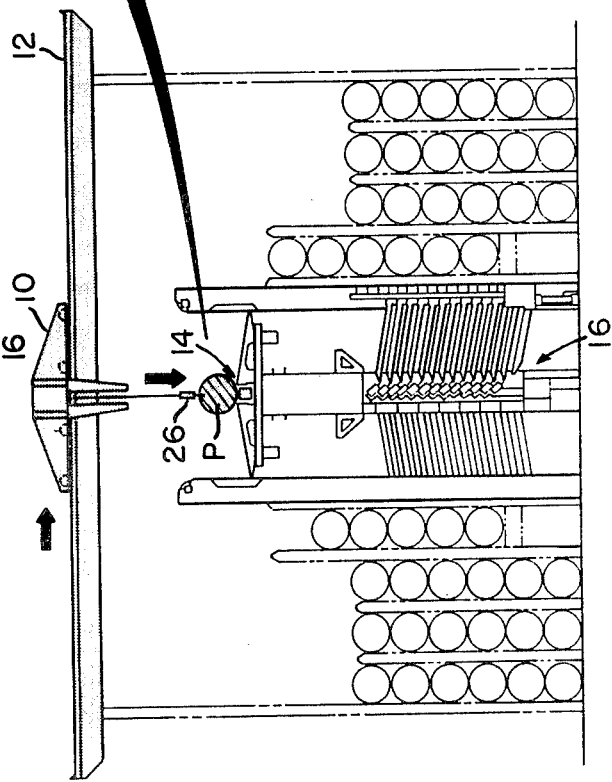
FIG. 6 is a fragmentary isometric of a portion of the pipe handling system in which the pipe is being moved axially on a stake adapter.
Figure 9:
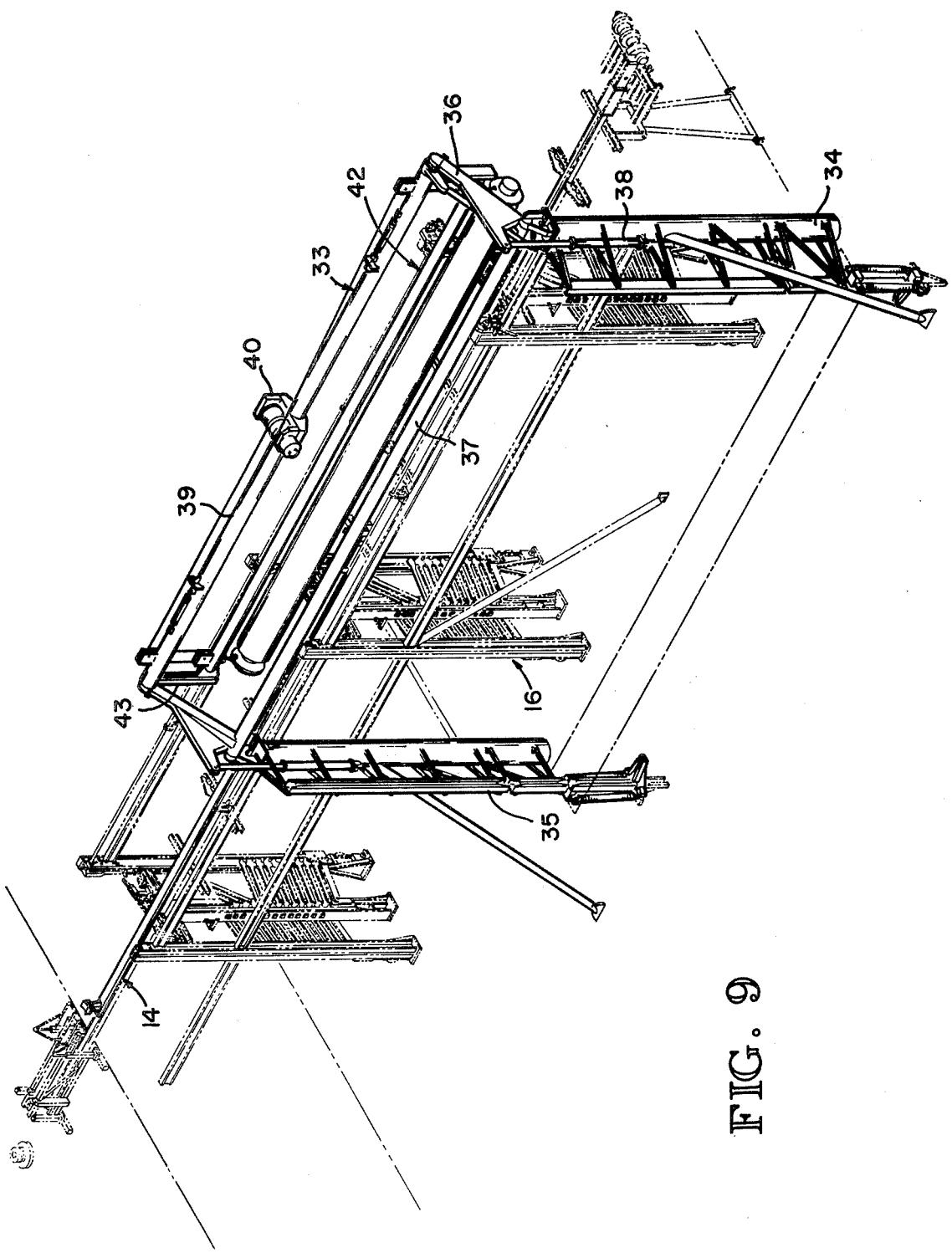
FIG. 9 is a fourth embodiment of a pipe handling system in which pipe is delivered from below deck to a pipe skate by a swing crane.
Figure 12:
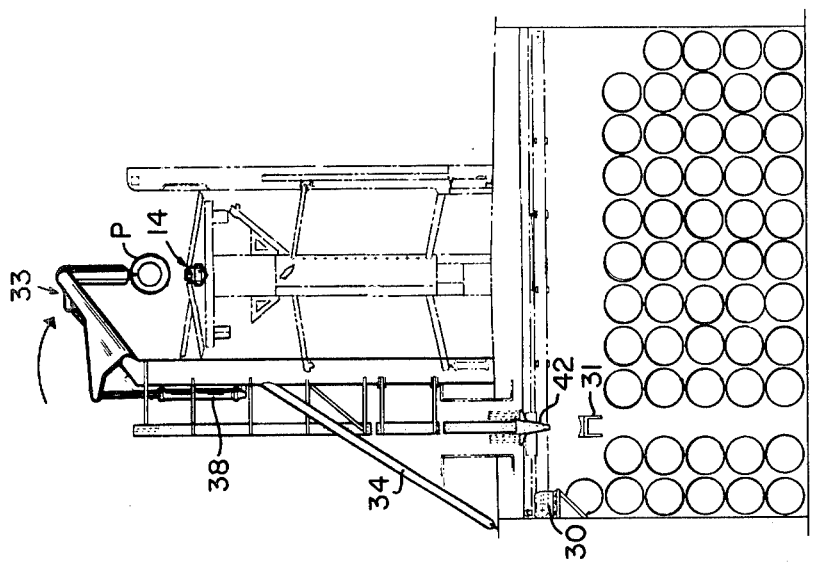
FIG. 12 is a third operation delivering the pipe to a central skate.
Figure 11:
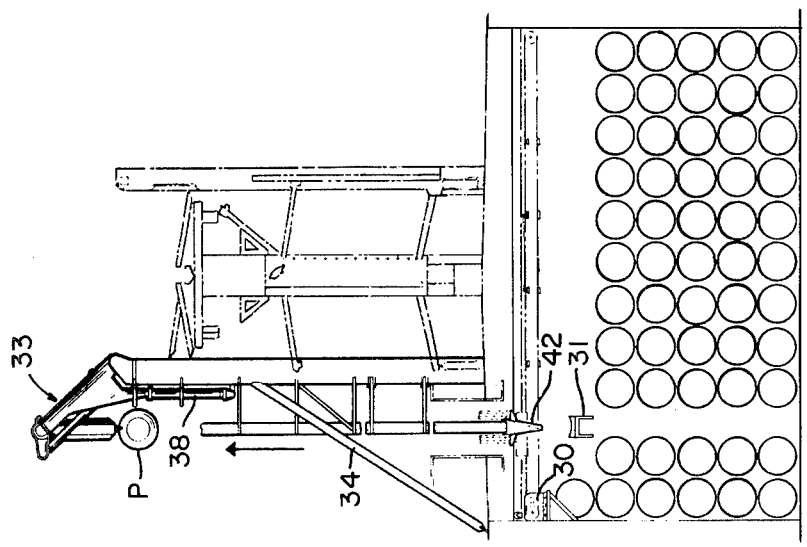
FIG. 11 is a second operation lifting a pipe.

As best shown in FIGS. 1 and 2, the bins 18 of the riser and casing racking means are spaced transversely across the center of the vessel S for assisting in stabilizing the vessel. The bins include a plurality of upright dividers 23 which can be of a length suitable to handle multiple columns of pipe such as shown in FIGS. 3-5. Aligned centrally between the dividers 23 are upright guide channels 24 which extend upwardly above the bins and are joined at common bars 25. The bridge crane 10 is provided with a strongback or lifting beam 26. The ends of the lifting beam slide within the guide channels 24 so that the pipe as it is being raised will not swing under the influence of wave action on the vessel. The bridge crane is also provided with stabilizing channels 27 at its opposite ends which receive the ends of the lift beam as the lift beam reaches its uppermost location as shown in FIG. 1 to prevent swinging movement of the pipe when the pipe is lifted free of the bins 18. As the pipe is then trapped within the stabilizing channels, the bridge beam can move along the beams 12 to deliver the pipe to the axial transport means 14.

FIGS. 3-5 illustrate a typical operation. In FIG. 3 the lifting beam 26 is lowered in the guide channels 24 until it is directly over a pipe P. Preferably hooks 28 carried by the lifting beam are then inserted in the ends of the pipe and the pipe is secured to the crane. Next, the lifting beam is raised by a hoist on the bridge crane with the ends of the lifting beam being guided in the guide channels 24 and finally, as shown in FIG. 4 within the stabilizing channels 24. Next, the crane is moved along the beams 12 until the lifting beam is centered over the axial transport means 14 where it is lowered onto a suitable skate which will be described. Removing a pipe from the skate and returning it to the storage bins is performed in the opposite manner.

FIG. 7 illustrates a second embodiment of the bridge crane type handling system. In this system, the beams 12 extend over three sets of rack bins 18a, 18b and 18c. Bin 18a holds the fragile skinned riser pipe RP and is provided with the vertical guide channels 24 to prevent swinging and damage to the fragile skin. The bins 18b hold casing pipe CP and do not require the guide channels since these sections of pipe can be subjected to rougher handling. The third bins 18c will handle drill pipe which is of a much harder material which can be treated to rougher handling and thus does not need the guide channels. Note that the drill pipe bins 18c is a substitute for the drill pipe racker 16 shown in the embodiment of FIG. 1. As is readily apparent all of the pipe will again be lifted by the lifting beam 26 using suitable hooks or other conventional techniques for securing the pipe to the lifting beam. The pipe will then be lifted and delivered to the axial transport means 14.

FIG. 8 illustrates still a third pipe handling embodiment in which riser pipe or casing pipe is stored in bins 18 in one or both of the holds of the vessel H1 or H2. Only a single bin 18 is shown in each hold, it being understood that the bins will extend across the entire floor of the hold. The holds each have a conventional bridge crane 30 which can lift pipe out of the bins 18 and deliver it to a pickup position 31. A guide channel 24a extends down into the lower hold H1 and H2. As is readily understood, the appropriate bridge cranes from holds H1 and holds H2 will reach down into the bins 18 and bring pipe to the pickup position 31. The bridge crane 10 will then lower the lifting beam 26 to pick up the pipe at the pickup position and carry it to the axial transport means 14. Obviously, the above deck bins 18 and the central pipe racker 16 are also available for use.

Figure 10:
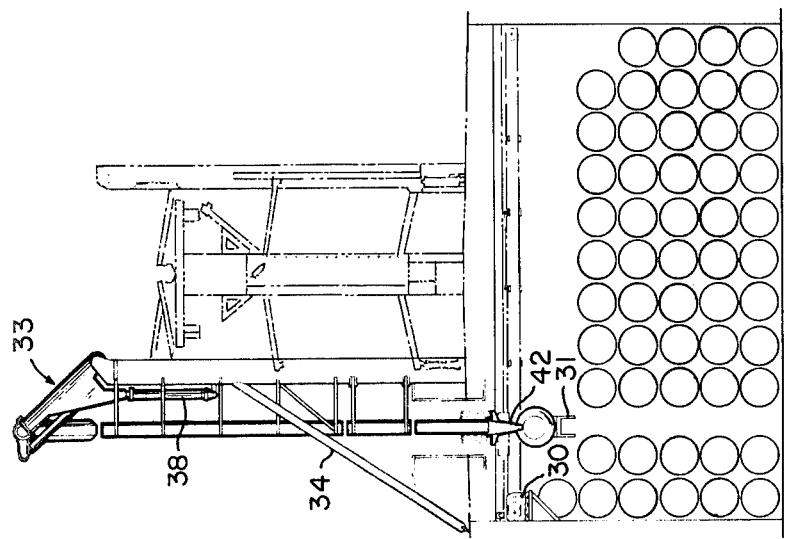
FIG. 10 is a schematic end elevation of one step in the operation using the swing crane.

A fourth embodiment of a pipe handling system is illustrated in FIGS. 9-12. In this embodiment, the pipe racker 16 or suitably supported axial transport means 14 similar to the arrangement shown in FIG. 7 is employed. Rather than use an overhead bridge crane, however, the pipe handling system employes a swing crane 33. The swing crane 33 includes a pair of vertical supports 34 which include longitudinally spaced aligned guide channels 35. A pair of swing arms 36 are rigidly connected by a pivot rod 37 and are swung from the solid line position in FIG. 12 to the solid line position in FIG. 10 by a pair of hydraulic cylinders 38. Positioned on the end of the swing arms 36 is a rigid crane girder 39 which mounts a winch and cable system 40. The cables are directed over suitable sheaves and suspend a lifting beam or strongback 42. Thus, the winch allows the lifting beam to be lowered and raised. The lifting beam as in the earlier embodiments has ends which track in the guide channels 35 to prevent the lifting beam from swinging when being raised and lowered along the vertical supports. Suitable stabilizing channels 43 are also provided on either end of the crane girder to stabilize the lifting beam when it is in a raised position. The operation of this embodiment is best seen from FIGS. 10-12. In FIG. 10 the lifting beam 42 is lowered into the hold of the vessel where a suitable bridge crane 30 has delivered a section of pipe to a pickup station 31. Suitable hooks are connected to the pipe and the lifting beam is raised into the position shown in FIG. 11. Finally, the lifting beam is swung through the swing arms as the swing arms are pivoted into the position shown in FIG. 12 and the pipe is then lowered onto the axial transport means 14. This type of system advantageously lends itself well where there is a limited amount of deck space available on the vessel such that the pipe handling system can be confined to the longitudinal center line of the vessel above deck.

Piggyback Skate or Skate Adapter

One of the unique components of this overall pipe handling system which allows a smaller drill pipe handling system to accommodate the larger diameter casing pipe and riser pipe is the skate adapter illustrated in FIGS. 13, 14, 15 and 19. The axial transport means 14 includes a small wheeled skate 45 having two sets of wheels 46 spaced longitudinally. Such a skate is adapted to receive the pin end of 3½ or 5 inch diameter drill pipe and by the means of a skate conveyor 46 move the drill pipe axially to the right to FIG. 14 where it is engaged by the stabber 47 and the drilling rig elevator 48. Such a small skate is not suited for handling the much greater diameter casing pipe (such as 20 inches or conductor pipe such as 30 inches) or the much greater diameter riser pipe (such as 52 inches or larger, some with a buoyancy material cover provided). It is a unique feature of this invention that the drive conveyor 47 and the smaller skate 45 are used with a piggyback skate or adapter 50 which has one end (the left end as snown in FIG. 14) mounted on a horizontal pivot pin 50b. The pivot pin is mounted in a pivot plate 50a that is bolted centrally along the longitudinal length of the skate 45 so that the load of the adapter is distributed equally to all of the wheels 46. The opposite end of the adapter 50 is provided with a trolley or carriage 51 that travels on the same skate track as does the pipe skate 45. Thus, the riser pipe is supported throughout its length on the adapter 50 with only the end of the riser pipe extending beyond the adapter 50. At this point the riser handling sub 53 is attached and the rig elevators hoist the riser into the derrick. As is best shown in FIG. 13, the adapter is also provided with a trolley guide track 54 which receives a riser/casing carriage or subskate 55. This subskate carries one end of the riser pipe and supports it from abrasion as it is moved into the drilling rig as best shown in phantom in FIG. 13 and in solid line in FIG. 15.

Spin rolls

Figure 25:
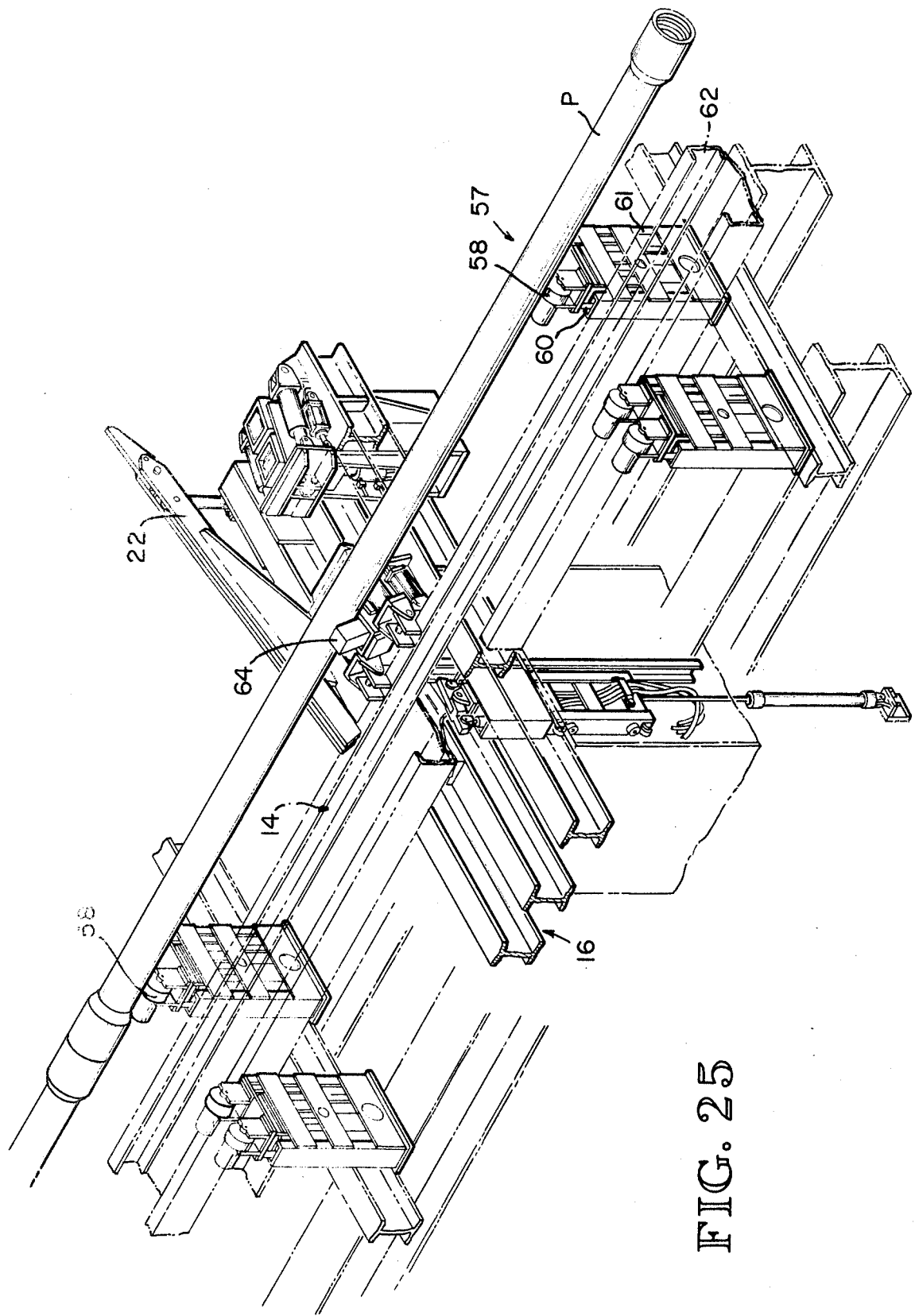
FIG. 25 is an enlarged, fragmentary, isometric showing the spin rollers in operation with a pipe racker of the type shown in FIG. 21.

As is well known, drilling rig operations like to trip pipe in multiple section, for example, three interconnected 30 ft. sections or two interconnected 45 ft. sections. However, when adding drill pipe to the drill string during drilling, the pipe is added in single sections, either 30 ft. or 45 ft. lengths. As a result, the customary practice is to trip the pipe, breaking the joint between sections with tongs and then returning the loosened but interconnected sections to the pipe racking means. When drilling recommences, the pipe is added in singles, either in 30 ft. or 45 ft. disconnected sections. It is a unique feature of this invention to provide spin rolling means 57 adjacent the axial transport means 14 so that interconnected sections received from the pipe racking means 16, for example, can be individually spun and thus become separated from the previously stored, connected sections. As best shown in FIG. 20 and 25, the spin rolling means includes four sets of powered spin rollers 58 on either side of the axial transport means 14 and two sets of dead rolls 59 on either side of the axial transport means. The particular arrangement shown is used on three 30 ft. sections of drill pipe. Each set of spin rolls includes a roller assembly 60 mounted for vertical movement within a guide frame 61 which is rigidly secured to a longitudinal beam 62 forming a part of the pipe racking means 16. An air cylinder 63 raises and lowers the rolls 58 above and below the ramp arms 22 of the pipe racking means 16. As best shown in FIG. 23, the center line, equidistant between the sets of rollers 58, is aligned slightly above a retractable stop 64 that holds pipe P on the ramp arms prior to releasing the pipe for movement down to the axial transport means 14. Stops of this type are well known and the details will not be described. Thus, multiple pipe sections deposited on the ramp arms from the conveyor 21 of the pipe racking means 16 will roll down the ramp arms until engaging the stops 64. At this time, the air cylinders 63 are actuated to raise the spin rolls 58 up to engage the multiple sections. At this time the spin rolls of one section are rotated while the other remain stationary to disengage the spun section from the remainder of the pipe. This disconnected section is then deposited on the axial transport means and delivered to the drill rig for adding to the drill string in the well.

As best shown in FIG. 22, the spin rollers are adjustably mounted to change the distance between their respective center lines so that smaller or larger diameter pipe can be accommodated. In addition the rollers axes of rotation are inclined as shown in FIG. 24 offset from the pipe axis approximately at the angle of the thread helix so that an axial force component is applied to the spun section to axially separate it from the remaining sections.

Stabber

Another unique component of the overall pipe handling system is the stabber, roughneck or pipe positioning mechanism 47 which guides the lower end of the pipe as the upper end is being handled by the drilling rig elevator. Stabbers are well known in the art. Seemingly minor improvements to prior art stabbers have significant economic consequences since mishandling of a riser pipe for example, with its fragile buoyant covering, can cause several thousand dollars worth of damage and delays. Furthermore, most stabbers can efficiently handle only drill pipe or larger pipe but not both. One of the first unique features of the stabber of this invention is that it is a completely modular unit being totally supported on its own frame 66. This allows the parts of the stabber which are prealigned at manufacture to be automatically aligned when the modular frame is set in alignment with the end of the axial transport means 14 and with the well hole WH. Mounted on the frame 66 are two sets of vertical frames 68 and 69 spaced on either side of the longitudinal center line of the stabber. Each vertical frame can be adjusted transversely by a common shaft 70 which drives a pair of pinions 71 which mesh with racks 72 on the frame 66. A suitable socket 73 is provided on opposite ends of the shaft so that through the use of a wrench one operator can rotate the shaft simultaneously moving the longitudinally spaced ends of the vertical frames 69, for example, so that the spacing between the frames 68 and 69 at both longitudinal ends is accurately maintained during movement of the vertical frame.

Figure 32:
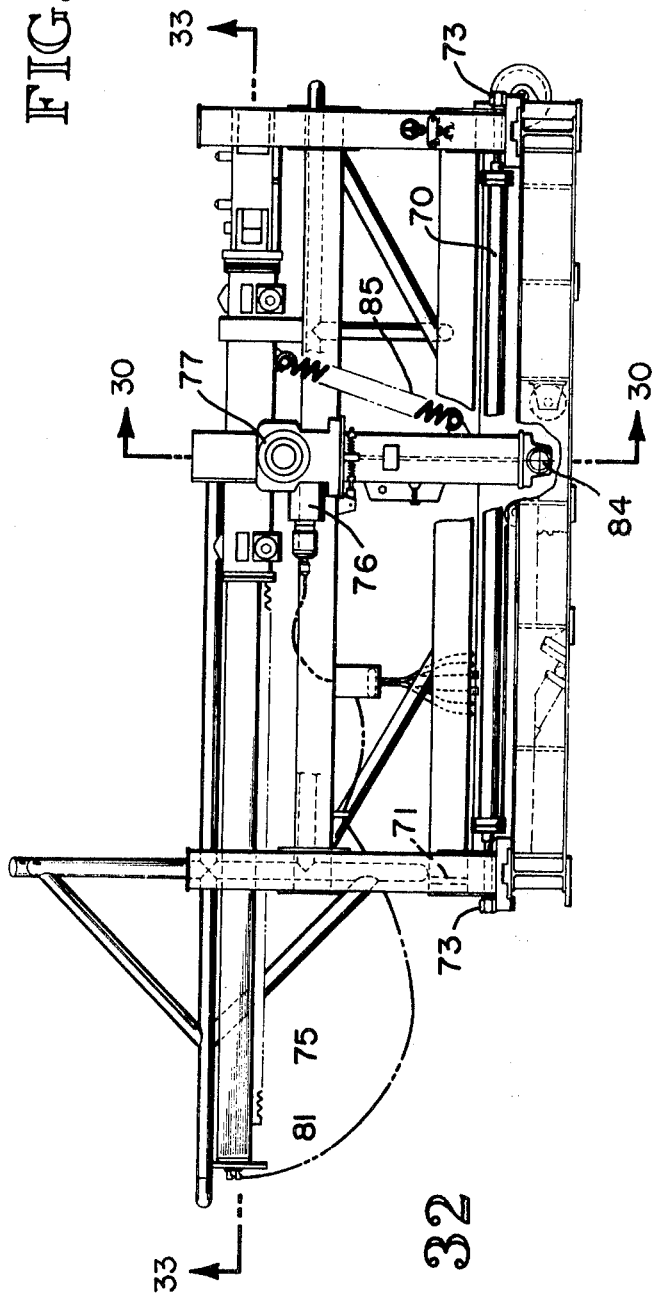
FIG. 32 is a longitudinal vertical section of the stabber.

A second unique feature relates to the extension of stabber arms 75. It is desirable to extend the stabber arms exactly in synchronism with one another to assure that the pipe trapped between the arms is not damaged. Heretofore, synchronism was obtained by a common mechanical drive which has proven to be unsatisfactory causing binding in movement of the arms and allowing them to become out of alignment with one another. It is a unique part of this invention that each of the arms is driven independently by an hydraulic motor 76 through a gear box 77. The gear box drives a pinion shaft 78 to which is connected a pinion gear 79 and a sprocket 80. The sprocket from each pinion gear meshes with a rack 81 (FIG. 32) to extend the arm. Synchronism between the movement of the arms is obtained by a chain 82 passing from each sprocket 80 which is entrained about a sprocket 83 connected to a common shaft 84. The shaft 84 is telescoping and splined to allow changing the spacing between the stabber arms. In operation, the two hydraulic motors are operated simultaneously from a common hydraulic source and begin to extend the arms simultaneously. If one arm is moving faster than the other, however, the chain drive on the pinion shaft 78 of that arm will transmit the higher velocity and attempt to turn the common shaft 84. In turn, the chain drive on the opposite arm will try to accelerate reducing the resistance to movement on the opposite arm thus, coupled with the power from the hydraulic motor on the opposite arm, will accelerate extension of the opposite arm while simultaneously the increased resistance to movement caused by that arm will provide an additional resistance to the first arm slowing its outward extension. As a result, the common drive shaft 84 in effect will regulate the extension speeds of both of the arms so that they move simultaneously.

The stabber arms 75 are each also mounted for limited pivotal movement about a horizontal axis concentric with the shafts 78. Springs 85 hold the arms down but allow the outer jaw ends of the arms to be raised by the pipe if an operator inadvertently tries to raise the pipe without first releasing the jaws.

A customary provision for a stabber is to place a roller at the drilling rig end of the stabber to stop swinging movement of the pipe while it is being lifted by the rig elevator. Since the stabber must accommodate different size pipes, however, it is found that this roller must be placed or an adaptor added each time the vertical frames 68 and 69 are displaced to accommodate a different diameter pipe. This is time consuming and expensive. It is the unique feature of this invention that entrapment of the lower end of the pipe is uniquely provided by an adjustable chain 86. As best shown in FIG. 30, the chain 86 is fastened on the vertical frame 69 by a spring shock mounting 87 and is locked at its opposite end in the vertical frame 68 in a conventional chain clamp 88. The chain clamp as shown in the detail drawing holds the chain but can be released by opening a cover plate and quickly allowed to slide through the vertical frame 68 for expanding the distance between the vertical frames or can be cinched up tight again when the frames are moved toward one another.

Figure 31:
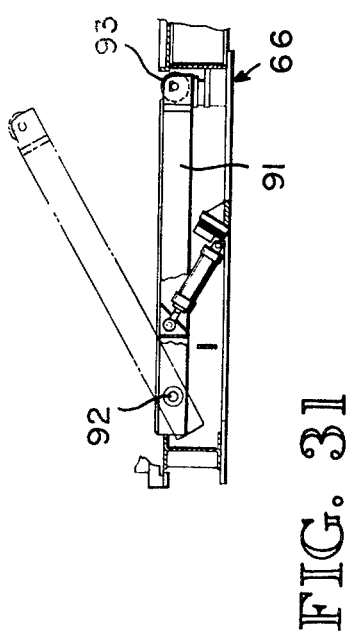
FIG. 31 is a fragmentary illustration of a portion of the stabber shown in FIG. 27.

Another improvement in the stabber is the location of the stabber lift arm 91. As is best shown in FIGS. 27 and 31, the lift arm is pivotally mounted at its end furthest from the drilling rig floor. The pivotal mounting, however, is on the modular frame 66 rather than longitudinally spaced from the stabber as in prior art lift arms. This location of the pivot 92 allows the oncoming pipe to be lifted by the end roller 93 mounted on the arm to raise the box end of the pipe so that the operator can attach the drilling rig elevator. With prior art devices the lift arm was positioned too far upstream (in the direction of movement of pipe toward the drilling rig) such that shorter lengths of pipe such as 30 ft. sections could become unstable tipping over the lift arm roller in a clockwise direction. The location of the lift arm in the apparatus in this patent application is closer to the drilling rig floor so that the possibility of tipping the drill pipe endwise is eliminated. Secondly, the roller 93 being prealigned at time of manufacture is at all times perfectly aligned within the modular frame of the stabber greatly facilitating installation of the stabber in line with the axial transport means 14 of the pipe handling system.

Figure 29:
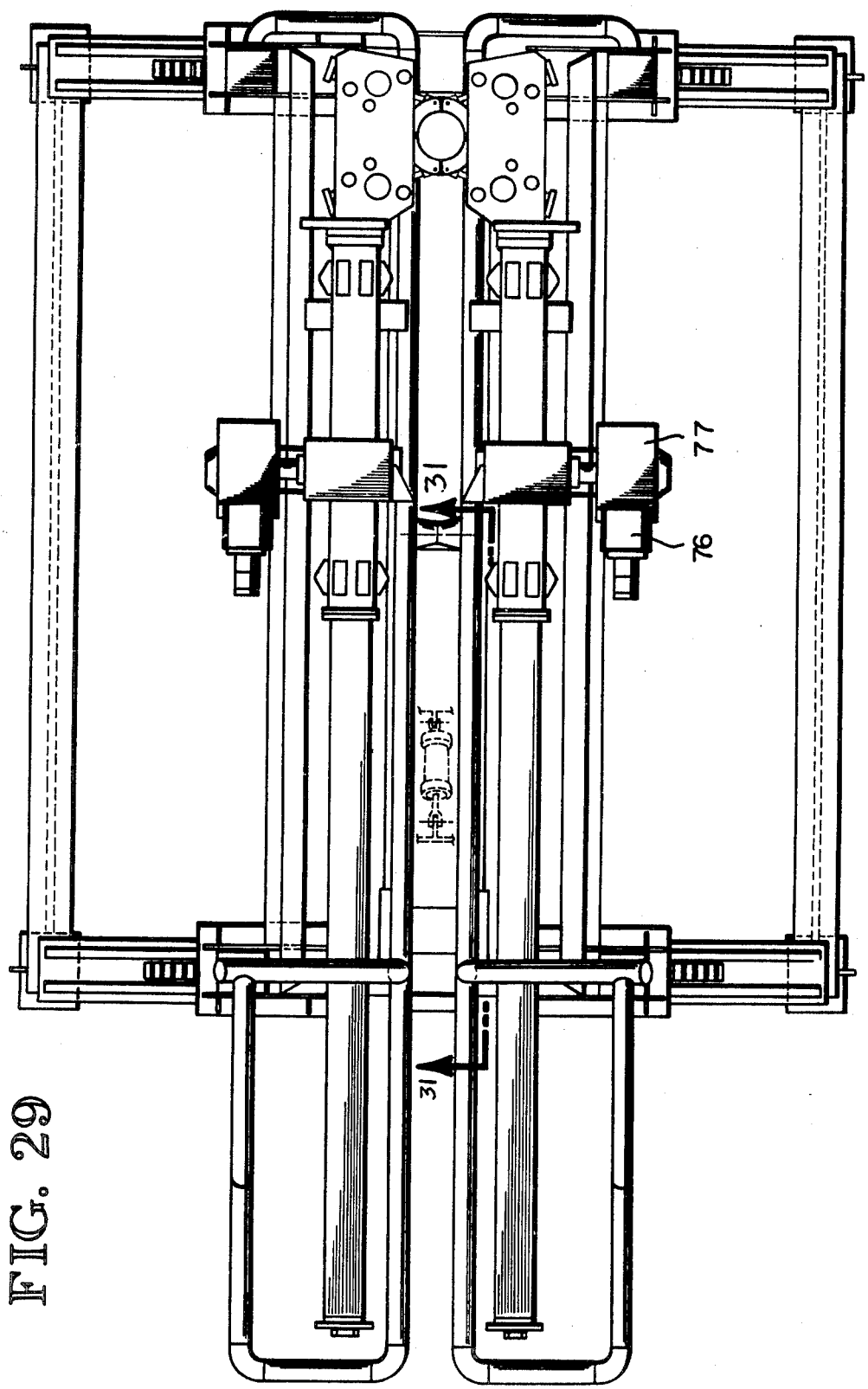
FIG. 29 is a plan view of the stabber.
Figure 33:
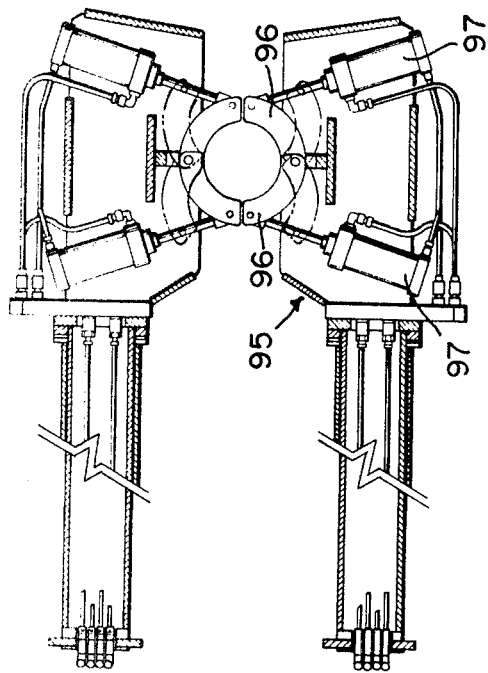
FIG. 33 is a fragmentary horizontal section taken through a portion of the stabber.

Another unique feature of the invention is that by using various jaw adapters the stabber arms of the stabber can be used to handle the much larger diameter casing and riser pipe. As best shown in FIG. 33 the stabber arms 75 terminate in pipe jaw assemblies 95 which include jaw segments 96 that are pivotally mounted in the jaw assemblies and are positioned to form a closed ring against the pipe as shown in FIGS. 28 and 29. The jaw segments are positioned by pneumatic cylinders 97.

FIG. 18A illustrates the mounting technique for one of the pipe adapters such as a casing adapter 100. Each jaw assembly 95 is provided with a set of spacer blocks or pads 101. The casing adapter is also provided with spacer blocks or pads 102 that rest on the blocks 101. Alignment bolts 103 having seats 104 hold and guide the pipe adapter onto the jaw assembly 95. Thus with two bolts 103 an adapter can be accurately secured to a jaw assembly. The casing adapter 100 (FIG. 17) is a self-contained adapter assembly and is provided with pivotally mounted casing jaws 106 which are positioned by independent pneumatic cylinders 108. Similarly, riser adapters 110 are also provided with spacer blocks to rest on the blocks 101 and are aligned and bolted by bolts 103 to the jaw assemblies 95. The riser adapter also has jaw segments or rollers 111 which are pivotally mounted on the riser adapter and positioned by pneumatic cylinders 112. All of the cylinders 112, 108 and 97 are provided with quick-disconnect air lines which can couple to a common air supply terminal for quick changing of the adapters.

As best shown in FIGS. 34 and 35, still another adapter is illustrated. This adapter 115 for riser or casing pipe CP is suitable for allowing use of the stabber arms 75 in handling pipe beyond the well hole WH where pipe is delivered from an offset ramp 117. The pipe added to the string is raised by the drill rig elevator 48 until the lower end is on the rig floor and the operator secures the pipe CP against the adapter 115 by a chain 120. The stabber arms are then retracted aligning the pipe over the well hole for coupling to the string. Tripping is the opposite sequence.

While preferred embodiments are illustrated and described, it should be understood that variations and further modifications will be apparent to one skilled in the art without departing from the principles hereindescribed.

The embodiments of the invention in which an exclusive property or privilege is claimed are defined as follows:

1. A modular stabber for moving the end of a pipe to or from a well hole axis along a longitudinal path comprising:
   a base frame,
   transversely spaced upright support means each forming part of a side frame, each of said side frames being in a side-by-side relation to each other and being movably mounted on said base frame,
   means for moving both said support means transversely equal amounts for adjusting the spacing between said side frames, longitudinally extendible pipe grabbing means on said side frames for positioning the pipe, and means for moving said longitudinally extending pipe grabbing means relative to said side frames to move the end of a pipe to and from the well hole axis.

2. The stabber of claim 1, said moving means including transverse racks on said base frame below each upright support,
   a pinion gear on each upright support in meshing engagement with said racks, a common shaft keyed to the pinion gears of each transverse set of upright supports, and means for rotating said common shafts to simultaneously move the pinion gears along the gear racks.

3. A modular stabber for moving a pipe end to end from a position where it is suspended above a well hole axis comprising,
   a unitary base frame,
   two transversely spaced side frames transversely movably mounted on said base frame,
   longitudinally extendible pipe grabbing means on said side frames for moving the end of a pipe to and from a well hole axis,
   means for simultaneously extending said pipe grabbing means,
   a pipe end lifting roller pivotally mounted between said side frames for movement in a vertical plane,
   cylinder means for raising said pipe end lifting roller, and
   adjustable stop means between said side frames adjacent the well hole axis for arresting movement of the pipe end when the pipe is suspended above a well hole, and
   wherein said pipe end lifting roller, pipe grabbing means, movable side frames, and adjustable stop means are all prealigned during manufacture for locating as an integral modular package adjacent said well hole axis.

4. The stabber of claim 3, said pipe grabbing means including two jaw arms, said means for simultaneously extending said pipe grabbing means including commonly powered hydraulic motors, means drivingly coupling each motor to one of said jaw arms, and a common transmission means coupled to each said jaw arms for transferring movement of one arm to a load on the other arm whereby the hydraulic motors will self-regulate the extension speed of the jaw arms for simultaneous movement.

5. The apparatus of claim 4, said jaw arms drivingly coupling means each including a gear rack on each jaw arm, a pinion gear meshed with each rack, and each hydraulic motor including an output shaft keyed to said pinion gear, and further including pivot means concentric with said output shafts for pivotally mounting the jaw arms for movement in vertical planes.

6. The apparatus of claim 5, said common transmission means including a common shaft rotatably mounted on said base frame, sprockets on said common shaft, sprockets on said motor output shafts and chains coupling said common shaft and output shafts sprockets.

7. The apparatus of claim 3, said adjustable stop means including a flexible chain, shock absorbing means mounting one end of said chain to one side frame, and releasable chain latching means on the other side frame for releasably holding the chain between said side frames.

8. The apparatus of claim 3, said extendible pipe grabbing means including pivot means for pivotally mounting the pipe grabbing means on said side frames for movement in a vertical plane.

9. The apparatus of claim 3, said side frames each including longitudinally spaced upright supports, and including means for moving said upright supports transversely simultaneously.

10. A stabber suitable for handling at least two pipe sizes of a first small diameter and a second larger diameter, comprising:
a base frame,
a pair of transversely adjustable side frames, said side frames being mounted on said base frame,
longitudinally extendible jaw arms on said side frames, means for moving said longitudinally extendible jaw arms,
a smaller pipe jaw assembly on each of said jaw arms suitable for handling the smaller diameter pipe, said jaw assembly including jaw segments, cylinder means for positioning the jaw segments and a power supply for powering the cylinders, the improvement comprising:
adapter jaw assemblies,
means for spacing and aligning each said adapter jaw assembly to said smaller pipe jaw assembly, each said adapter jaw assembly including larger pipe jaw segments, independent second cylinder means for positioning the larger pipe jaw segments, and means for coupling the second cylinder means to said power supply.

11. The stabber of claim 10, said spacing and aligning means including aligned pads on each of said smaller pipe and adapter jaw assemblies, said pads of the adapter resting against the pads of the smaller pipe jaw assembly for locating the adapter assembly vertically, at least two seats on said smaller pipe jaw assembly aligned with holes in the adapter assembly for locating the adapter pipe assembly horizontally, and quick-disconnect couplings for alternatively coupling the cylinders of the two assemblies to the power supply.

12. A stabber suitable for handling at least two pipe sizes of a first smaller diameter and a second larger diameter, comprising:
a base frame,
a pair of upright side frames mounted on said base frame, and axially extendible jaw arms longitudinally reciprocably mounted on said side frame, means for moving said jaw arms longitudinally reciprocably and having pipe small jaw assemblies, the improvement comprising:
an elongated jaw extension to each of said pipe small jaw assemblies and movable therewith, said extensions each having an end bumper and positioned to form a V-shaped opening therebetween for receiving a pipe into abutting relation therein, a flexible fastener secured to said jaw extensions in a position for wrapping around a pipe and holding it against said bumpers, and means for aligning the jaw extensions on said pipe small jaw assemblies.

13. The stabber of claim 1 wherein each upright support means includes at least two longitudinally spaced vertical frames, said moving means including means for simultaneously moving transversely equal amounts both of said vertical frames of each upright support means.

* * * * *